United States Patent
Matsuo et al.

(10) Patent No.: US 6,219,062 B1
(45) Date of Patent: *Apr. 17, 2001

(54) THREE-DIMENSIONAL GRAPHIC DISPLAY DEVICE

(75) Inventors: Shigeru Matsuo, Hitachi; Yasuhiro Nakatsuka, Tokai-mura; Jun Sato, Musashino, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,944
(22) PCT Filed: Mar. 10, 1995
(86) PCT No.: PCT/JP95/00402
§ 371 Date: Sep. 4, 1997
§ 102(e) Date: Sep. 4, 1997
(87) PCT Pub. No.: WO96/28794
PCT Pub. Date: Sep. 19, 1996

(51) Int. Cl.$^7$ .................................................. G06T 15/50
(52) U.S. Cl. ........................ 345/426; 345/431; 345/199
(58) Field of Search .................................. 345/426, 431, 345/199, 155, 153

(56) References Cited

U.S. PATENT DOCUMENTS

| | | | |
|---|---|---|---|
| 5,007,101 | * | 4/1991 | Iwahashi et al. ................... 382/42 |
| 5,490,239 | * | 2/1996 | Myers ................................ 395/129 |
| 5,724,561 | * | 3/1998 | Tarolli et al. ..................... 395/523 |

FOREIGN PATENT DOCUMENTS 7-21407 * 1/1995 (JP) .............................. G06T/15/00

OTHER PUBLICATIONS

"Computer Graphics": James D. foley, Andries van Dam, Steven K. Feiner, John F. Hughes; Section 17.3, 1992.*
In re Iwahashi (CA FC) 12 USPQ2d 1908, decided Nov. 7, 1989.*

* cited by examiner

Primary Examiner—Mark Zimmerman
Assistant Examiner—Mano Padmanabhan
(74) Attorney, Agent, or Firm—Antonelli, Terry, Stout & Kraus, LLP

(57) ABSTRACT

A three-dimensional display apparatus which calculates fog coefficients reflecting Z-axis values so that a fogging process in pixel data processing is carried out rapidly using the fog coefficient corresponding to any Z-axis value in effect, whereby the effect of 3D graphics display is enhanced and a plurality of fog processing algorithms are handled.

9 Claims, 9 Drawing Sheets

SOURCE IMAGE

DRAWN IMAGE

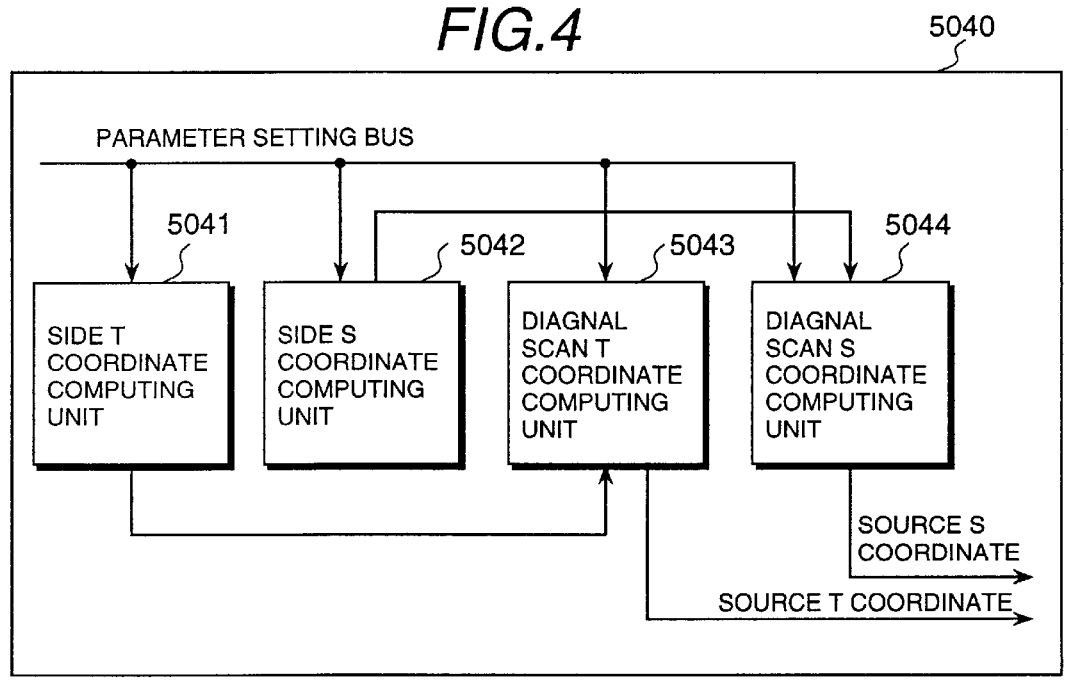
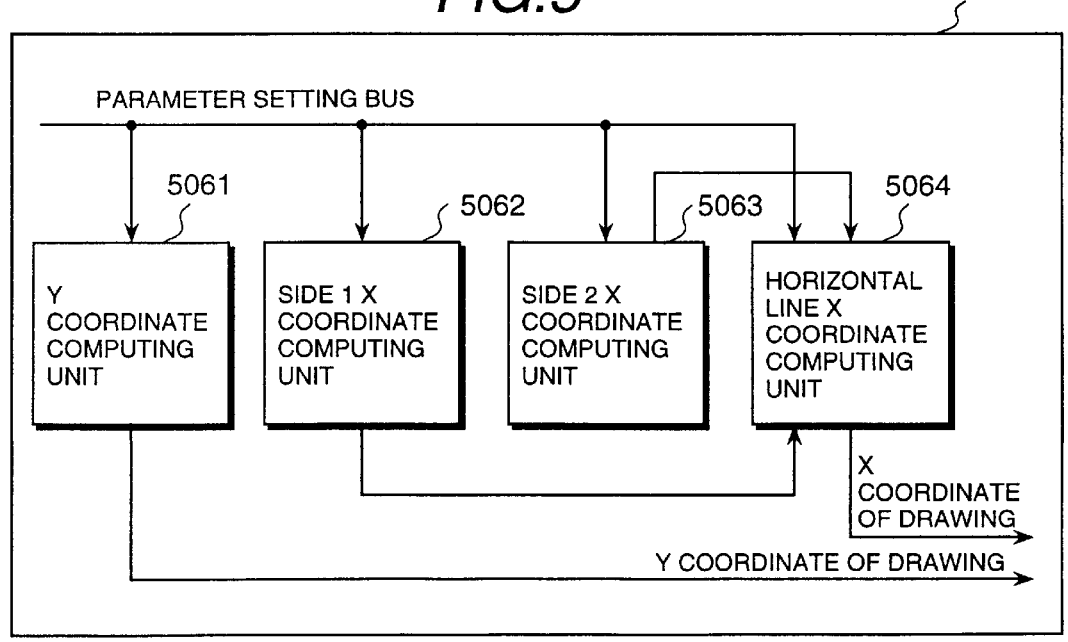

TYPICAL FIGURE LIST — 300

| Triangle P1,P2,P3 |
| Triangle P4,P5,P6 |
| Triangle P7,P8,P9 |
| Triangle P10,P11,P12 |
| ⋮ |
| Triangle Pl,Pm,Pn |

- START
- SET DATA TO ZPEEK AND 0 TO Z — 1100
- SET TABLE ENTRY COUNT (256 IN THIS EXAMPLE) TO TABLESIZE — 1101
- ZSTEP = ZPEEK/TABLESIZE — 1102
- SET COEFFICIENT TO density — 1103
- count = 0 (LOOP COUNTER SETTING) — 1104
- TABLE[count] = e^(-(density × Z)^2) — 1105
- Z = Z + ZSTEP — 1106
- count = count + 1 — 1107
- count = TABLESIZE? NO → loop; YES → END

THREE-DIMENSIONAL GRAPHIC DISPLAY DEVICE

BACKGROUND OF THE INVENTION

The present invention relates to three-dimensional graphics display techniques for displaying three-dimensional figures (i.e., 3D graphics) and, more particularly, to a three-dimensional graphics display apparatus for executing at high speed what is known as a "fog" display process to enhance the 3D or cubic display effect.

To implement a three-dimensional graphics display requires incorporating as many aspects of the real world as possible into a display so that the display imitates reality as closely as possible.

One technique for accentuating natural phenomena is that of displaying a fog scene. To display a fog scene involves: distinctly indicating foreground objects and figures (simply called objects hereunder), making the image of the objects foggier the farther they are located from the foreground, and having objects completely fogged out beyond a certain distance.

A similar technique is sometimes used to implement what is known as a depth queuing effect. This technique involves displaying objects more darkly the farther they are located from the foreground (i.e., in the depth direction), and not displaying at all those objects beyond a certain distance or depth (expressed in Z value; the distance or depth is simply called the Z value hereunder). The technique is designed to emphasize the sense of depth so as to bring about a more pronounced 3D display stage.

The aforementioned effects (generically called the fog effect hereunder) are discussed illustratively in Open GL Reference Manual (from Addison-Wesley Publishing Company, p. 128). The publication introduces the following three algorithms:

$$f=(end-z)/(end-start) \qquad (Exp.\ 1.1)$$

where, "start" stands for the Z value of a figure starting to be fogged, "end" denotes the Z value beyond which objects are completely fogged in, "z" represents the Z value of the figure to be drawn, and "f" indicates the density of fog (common to the remaining two algorithms).

$$f=e\hat{\ }-(density \times z) \qquad (Exp.\ 1.2)$$

where, symbol ^ represents a power exponent and "density" stands for a constant.

$$f=e\hat{\ }-(density \times z)\hat{\ }2 \qquad (Exp.\ 1.3)$$

Drawing data and/or display data is generated by use of the fog density value "f" from the above calculations and on the basis of color data and/or figure data.

With the above technique, the value "f" is acquired using the Z value of each pixel as the base for the calculations. This requires handling computations of exponentiation.

Therefore, one disadvantage of the conventional technique is that, with so much data to compute, a large amount of hardware is needed to realize high-speed processing.

Another disadvantage is that the calculations involved relegate the selection of the algorithm to application programs. The algorithm cannot be selected fixedly by hardware.

SUMMARY OF THE INVENTION

It is therefore an object of the present invention to provide a three-dimensional graphics display apparatus, which is structured simply, yet is capable of implementing a display involving the fog effect at high speed.

It is another object of the present invention to provide a three-dimensional graphics display apparatus having a fog effect display capability realized through the use of any one of a plurality of algorithms.

In carrying out the invention and according to a first aspect thereof, there is provided a three-dimensional graphics display apparatus comprising: a Z value generation device for generating depth data on either a figure or an object pixel for a pixel to be displayed; a display color data holding device for holding display color data to be used for display; a blend coefficient calculation device for calculating a blend ratio coefficient representing a color blend ratio of color data on either a figure or an object to be drawn on the basis of the Z value, with respect to the display color data; and a color data blending device for generating fog display color data by operating on the color data and the display data in accordance with the calculated blend ratio coefficient.

According to a second aspect of the invention, there is provided a three-dimensional graphics display apparatus comprising: a Z value generation device for generating depth data on either a figure or an object pixel for a pixel to be displayed; a display color data holding device for holding display color data to be used for display; a blend coefficient calculation device for calculating a blend ratio coefficient representing a color blend ratio of color data on either a figure or an object to be drawn on the basis of the Z value, with respect to the display color data; a blend ratio coefficient table for holding the blend ratio coefficient calculated with respect to a generated Z value; a table reference device for reading the Z value of a figure to be displayed and then reading from the blend ratio coefficient table the blend ratio coefficient corresponding to the read-out Z value; and a color data blending device for generating fog display color data by operating on the color data and the display data in accordance with the blend ratio coefficient read out by the table reference device.

The Z value generation device generates depth data (i.e., Z values) of each figure or object to be displayed. Based on the Z values thus calculated, the blend coefficient calculation device calculates a fog blend ratio for each of the pixels involved. In accordance with the calculated ratio, the color data blending device blends the color data on the figure or object with fog color data from the display color data holding device. This makes it possible to provide the appropriate fog effect on a pixel by pixel basis.

The blend ratio coefficient table stores the blend ratio coefficient (i.e., fog coefficient) corresponding to the depth data (Z values) on each figure or object. The coefficients are calculated in advance and the results are set in the table.

Where a figure is to be drawn, the blend ratio coefficient is calculated by referencing the table settings corresponding to the Z value for each of the pixels involved.

The blend ratio coefficient is acquired per pixel in the manner described. Fog display color data is then generated on the basis of the obtained blend ratio coefficient and in accordance with the color data and display color data on the figure or object in question.

Because blend ratio coefficients are stored beforehand in the table, complicated arithmetic processing is not needed in the coefficient computations in increments of pixels. This translates into a higher processing speed and a reduction in hardware.

Switching from one algorithm to another for computations is also made possible by modifying the table contents.

BRIEF DESCRIPTION OF DRAWINGS

FIG. 4 is a block diagram of a source coordinate computing unit for gaining access to texture images;

FIG. 5 is a block diagram of a drawing coordinate computing unit;

DESCRIPTION OF THE PREFERRED EMBODIMENT

Figure 1:
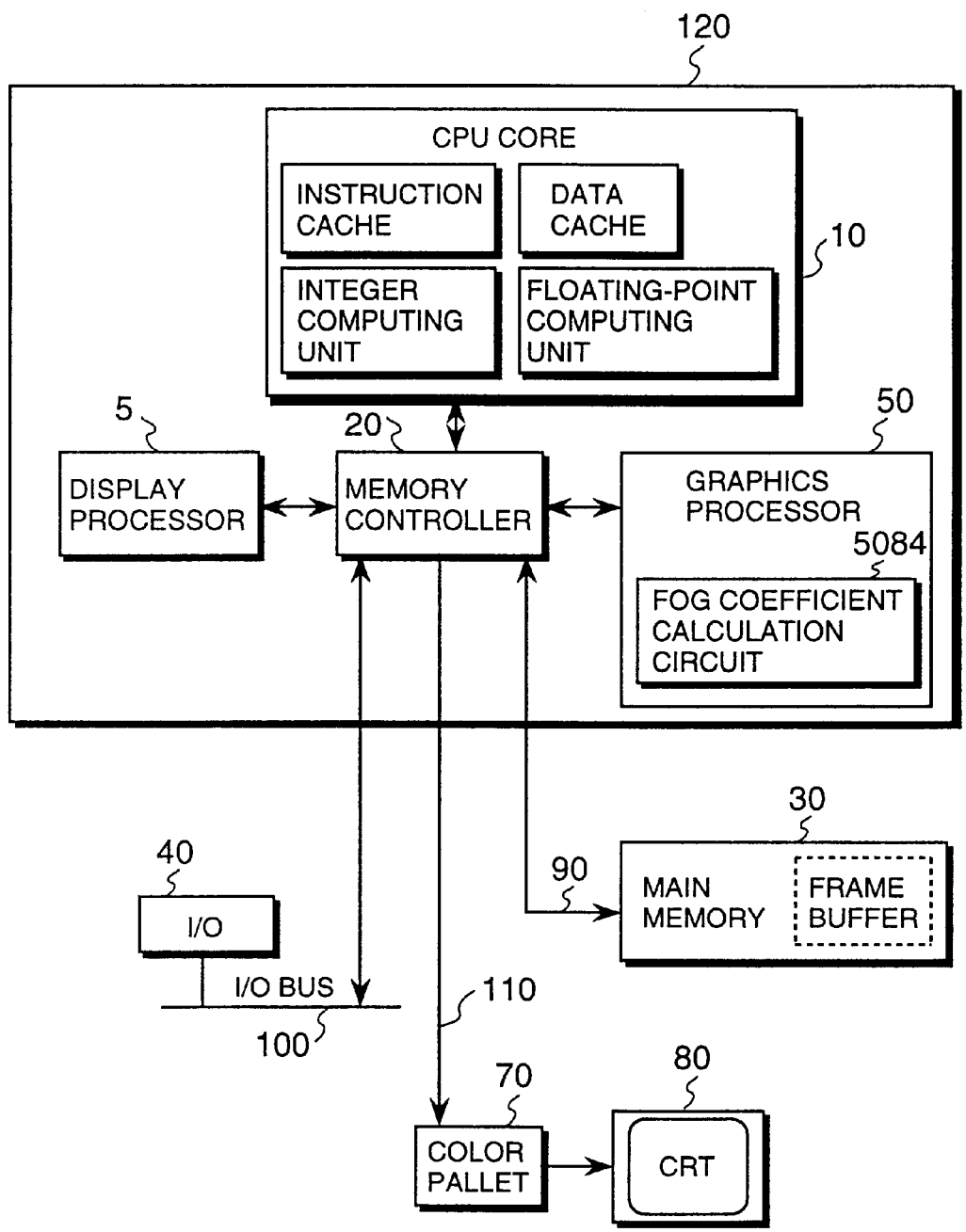
FIG. 1 is a block diagram showing a typical constitution of a graphics system for expressing a fog effect according to the invention.

FIG. 1 shows a typical constitution of a graphics system embodying the invention. Illustratively, the system may be a workstation, a personal computer or a portable data terminal. It comprises a processor 120 that performs such processes as the handling of data, data display and data input and output; a memory 30 that holds data and instructions (commands) and is subject to data read and/or write operations; a display device 80, such as a CRT, a liquid crystal display or a printer; and an input/output processing unit 40 that handles input and output of data with other processing and memory units.

The processor 120 includes a CPU core 10 that processes data and controls other processors, a graphics processor 50 that processes data to be drawn, a display processor 5 that performs timing processing to display data on the display device, and a memory controller 20 that controls transfers of data among the CPU core, the graphics processor, the display processor, and external devices including the display device 80 and memory 30.

The setup of FIG. 1 shows the display processor and graphics processor being independent of each other. Alternatively, the two processors may be implemented in a single processor section.

In FIG. 1, the CPU core has an integer computing unit and a floating-point computing unit constituting a computing section. Alternatively, either the integer computing unit or the floating-point computing unit alone may be provided depending on the application to which the system is applied. A cache memory is furnished as needed. In this regard is not mandatory to separate a data cache memory from an instruction cache memory as shown in FIG. 1.

The memory 30 in FIG. 1 is shown as comprising a frame buffer area that retains graphics data for display. Alternatively, the ordinary memory area may be simply separated from the frame buffer area.

The fog effect display that characterizes this invention is processed primarily by the graphics processor 50.

This graphics system displays a three-dimensional figure by performing the following steps.

The CPU core 10 calculates data on the vertexes of the figure to be displayed. The vertex data is stored in the form of a figure list into the main memory 30.

Figure 10:
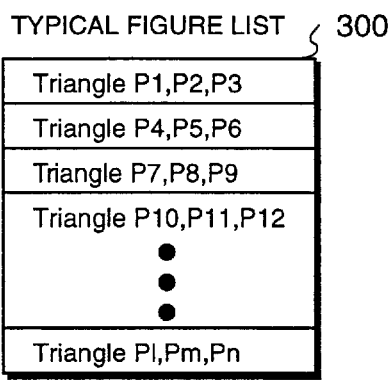
FIG. 10 is a diagram of a typical figure list.

The graphics processor 50 gains access to the figure list in the main memory. According to the figure list thus obtained, the graphics processor 50 draws the figure in the frame buffer area inside the main memory 30. FIG. 10 depicts a typical figure list. The entry "Triangle P1, P2, P3" at the top of the list constitutes a figure drawing command that designates the drawing of a triangle having three vertexes P1, P2 and P3. The commands that follow in the list specify the drawing of a plurality of triangles. The content of this figure list is made up of commands directed at the graphics processor 50. The graphics processor 50 decodes each of these commands in drawing the figures.

The data applied to the figure drawing process in the above manner is read out by the display processor 5. The retrieved data is transferred to the CRT 80 for display.

The graphics processor 50 operates a fog coefficient calculation circuit 5084 to calculate a fog coefficient (also called a blend ratio coefficient) of each pixel on the basis of depth data on the figure in question. The fog coefficients thus calculated are used as the basis for coloring and grading the figure for enhanced three-dimensional effects.

The memory controller 20 arbitrates attempts to access memory from the graphics processor 50 and display processor 5.

In the setup of FIG. 1, the system may be connected to a communication device, a CD-ROM. player or the like (not shown) via an I/O bus 100. This embodiment is one in which the CPU core 10, graphics processor 50, display processor 5 and memory controller 20 are formed in a single LSI chip.

Figure 2:
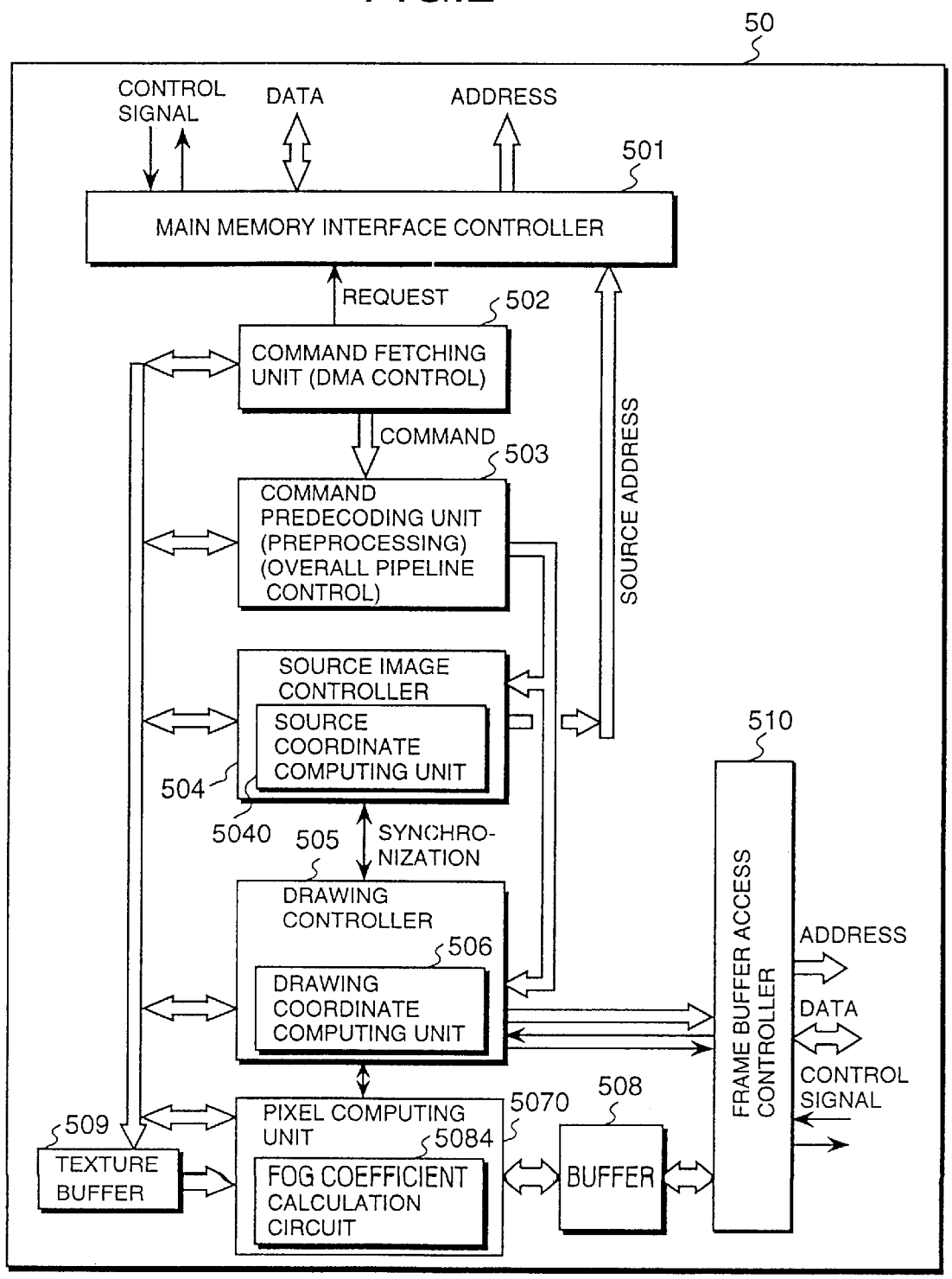
FIG. 2 is a block diagram of a graphics processor.

FIG. 2 shows an example of the internal structure of the graphics processor 50. In operation, the graphics processor 50 gains access to a command list 300 in the main memory 30 to read figure drawing commands therefrom. According to the commands, the graphics processor 50 draws figures in the frame buffer area. Each figure is assigned color data on its vertexes, depth data and texture pattern data. It is on the basis of such data that the graphics processor 50 calculates the coordinates, color and depth of each pixel for drawing each figure.

A main memory interface controller 501 acts as an interface that permits access to the command list in the main memory 30, exchanges data with the CPU core 10, and retrieves texture data.

A command fetching unit 502 manages addresses in order to read commands from the main memory 30 and controls access to the memory controller 20.

A command predecoding unit 503 decodes fetched commands to perform preprocessing, such as initial value calculations, and to provide pipeline management for the entire processing.

A source image controller 504 controls the reading of texture images from the main memory 30 when drawing figures entailing texture mapping. The addresses involved are managed as two-dimensional coordinates, and the coordinate values are computed by the source coordinate computing unit 5040.

The source images thus read out are placed into a texture buffer 509. Regarding the image data held in the buffer 509, there is no need to access the main memory 30 for their retrieval. This permits processing at higher speed.

A drawing controller 505 controls drawing of figures in the frame buffer area inside the main memory 30. A drawing coordinate computing unit 506 is a section that calculates coordinates of figures to be drawn in the frame buffer area.

A pixel computing unit 5070 computes color data on each of the pixels constituting each figure to be drawn. The pixel computing unit also calculates depth data (Z value) on each pixel to see if figures are overlaid, so that only the foreground figure is drawn.

A buffer 508 temporarily holds drawing data so that burst access to the main memory 30 is made possible during the drawing of figures. This provides a very effective means for enhancing the speed of processing.

A frame buffer access controller 510 generates control signals for accessing the main memory 30 according to the addresses computed by the drawing controller 505. Using the control signals thus generated, the frame buffer access controller 510 gains access to the main memory 30 through the memory controller 20.

In computing color data on each pixel, the pixel computing unit 5070 also performs fog effect computations which characterize this invention. Specifically, on the basis of the Z value calculated for each pixel, a fog coefficient computing unit 5084 in the pixel computing unit calculates the fog coefficient corresponding to the depth of each pixel. Given the coefficients, the pixel computing unit 5070 blends the color data and fog color for each pixel. This provides the appropriate fog effect in increments of pixels.

Figure 3:
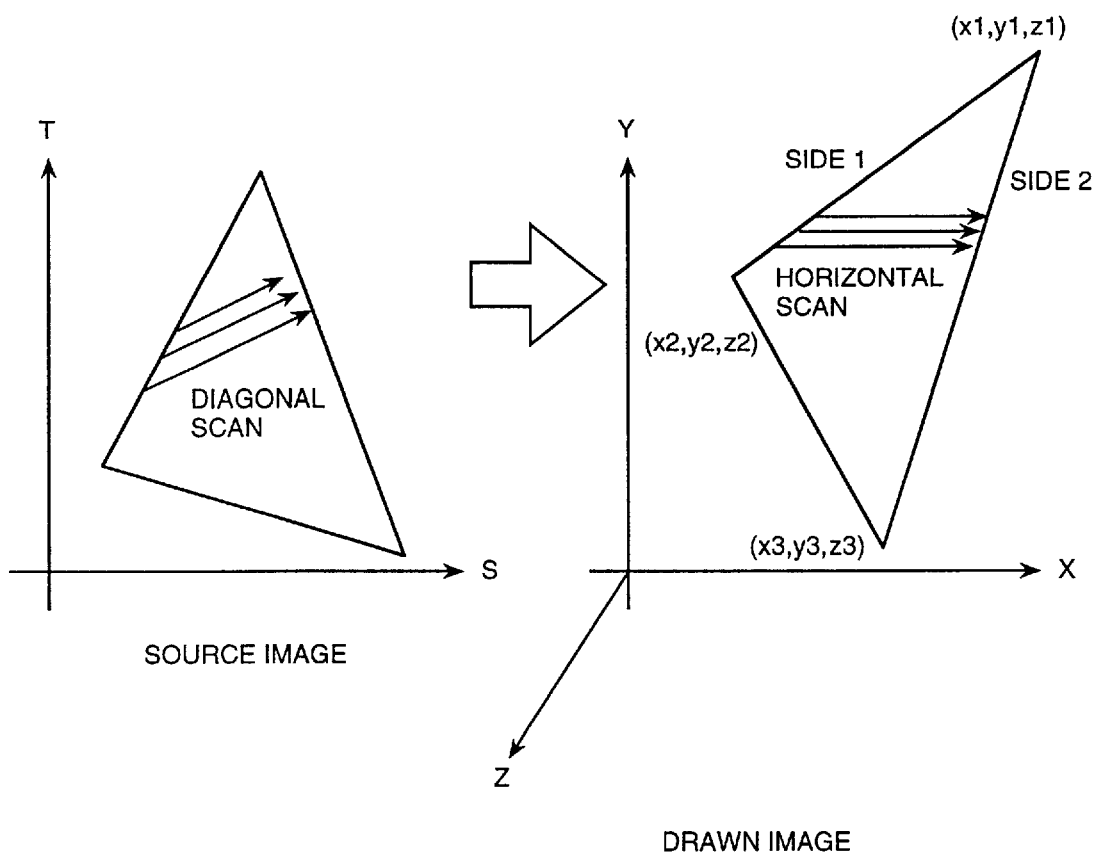
FIG. 3 is a diagram outlining how graphics processing is illustratively carried out.

FIG. 3 depicts what happens when the graphics processor 50 illustratively performs commands. In this example, the texture pattern of a source image triangle is mapped to a drawn image triangle.

The source image, managed in two-dimensional coordinates S and T, is scanned diagonally. The drawn image is managed in a three-dimensional coordinate system that supplements X-Y two-dimensional coordinates with a Z-axis coordinate, not shown. The drawing is realized by successively drawing horizontal lines between side 1 and side 2 of the triangle in question.

The workings of the graphics processor 50 in drawing the triangle will now be described in more detail.

FIG. 4 shows the source coordinate computing unit 5040 that computes S and T coordinates for gaining access to source images. A source image is a texture pattern of the figure to be drawn. Each source image is managed in two-dimensional coordinates that will be called S and T coordinates hereunder. To gain access to a source image requires successively computing the S and T coordinates corresponding to the drawing points involved.

The command predecoding unit 503 first initializes via a parameter setting bus the computing units making up the processor.

A side T coordinate computing unit 5041 and a side S coordinate computing unit 5042 compute the point from which to start diagonal scan of the source image.

On the basis of the starting point data thus computed, a diagonal scan T coordinate computing unit 5043 and a diagonal scan S coordinate computing unit 5044 compute the coordinate values pixel by pixel. The texture image is read from the main memory 30 in accordance with the coordinates thus calculated.

At the end of each scanning line, the side T coordinate computing unit 5041 and side S coordinate computing unit 5042 compute the coordinates of the next scan starting point.

FIG. 5 is a block diagram of the drawing coordinate computing unit 506. The computing unit 506 computes drawing coordinates (X and Y coordinates) of each pixel for a figure to be drawn in the frame buffer area.

After the computing units making up the processor have been initialized by the command predecoding unit 503 through the parameter setting bus, a Y coordinate computing unit 5061 determines the Y coordinate for a horizontal scanning line. A side 1 X coordinate computing unit 5062 and side 2 X coordinate computing unit 5063 calculate the X coordinates of the starting point and end point of the horizontal line.

A horizontal line X coordinate computing unit 5064 generates X coordinates that come between the two points. The drawing operation proceeds with the X and Y coordinates thus acquired.

Figure 6:
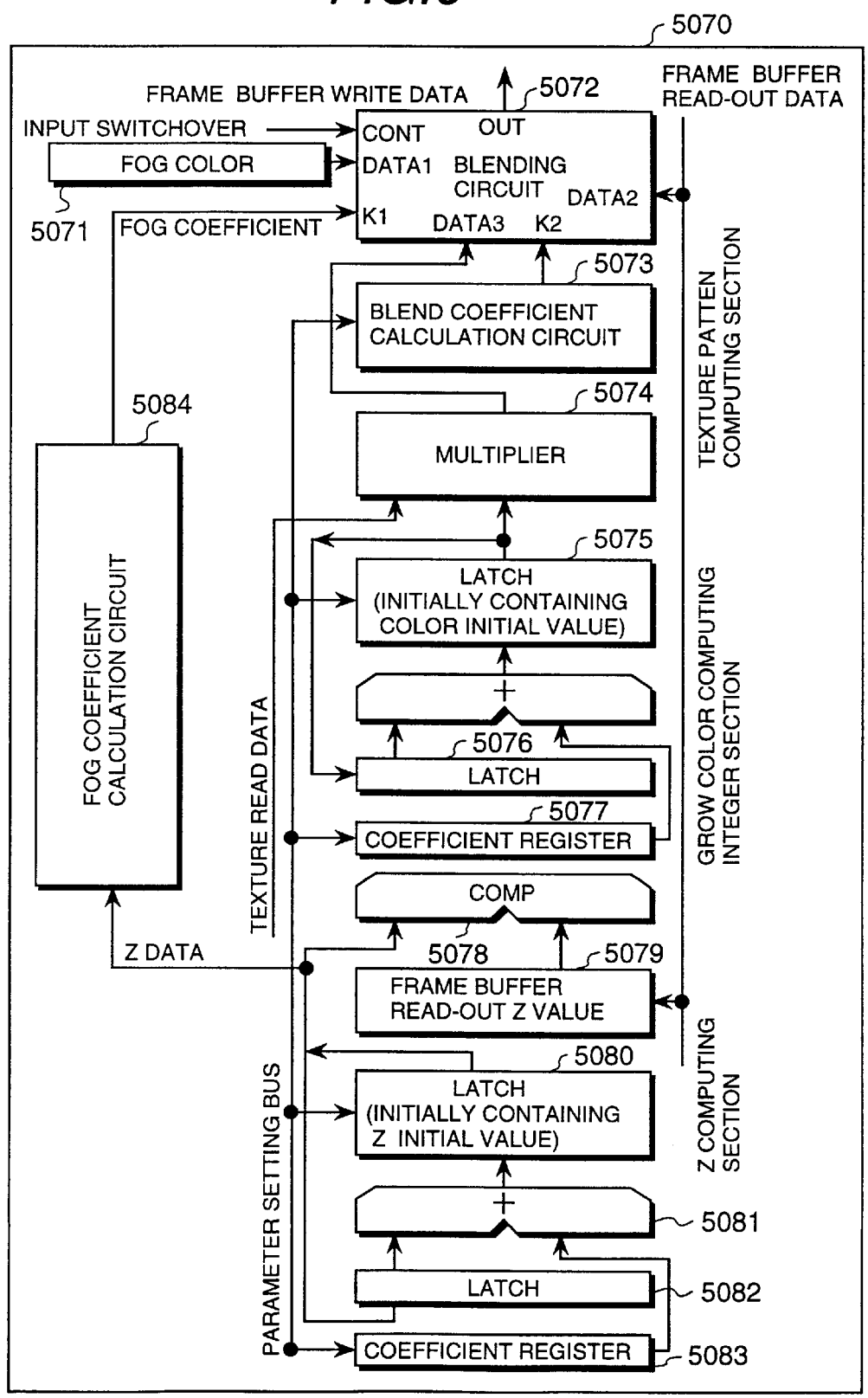
FIG. 6 is a block diagram of a pixel computing unit.

FIG. 6 is a block diagram of the pixel computing unit 5070. The pixel computing unit 5070 computes color data on each of the pixels making up the figure to be drawn. In successively determining the color data about each pixel, the pixel computing unit 5070 multiplies a source image with brightness data computed inside the unit 5070, the source image being read out in accordance with the S and T coordinates computed by the source coordinate computing unit 5040. The pixel computing unit 5070 also carries out fog effect computations in increments of pixels, a major characteristic of this invention.

A section ranging from a coefficient register 5083 to a comparator 5078 calculates and compares Z values. The coefficient register 5083 retains a Z value difference given when the X coordinate is shifted by one pixel. A latch 5080 holds that Z value of each pixel to be drawn which is computed successively by an adder 5081.

Meanwhile, a frame buffer read-out Z value register 5079 accommodates that Z value of the coordinate to be drawn next which is read from the frame buffer.

The comparator 5078 compares the content of the register 5079 with that of the latch 5080. If the Z value of the frame buffer is found to be the greater of the two values, the new pixel data is drawn; if the frame buffer value is the smaller, the pixel data is not drawn.

The process above allows only the foreground figure to be drawn. A section ranging from a coefficient register 5077 to a latch 5075 carries out glow color computations.

Glow color computations constitute a way of linearly interpolating the difference in color data between side 1 and side 2, pixel by pixel, when lines are drawn from side 1 to side 2 to complete the figure in FIG. 3. A brightness value of each pixel is acquired through glow color computations. The result is multiplied by texture data by means of a multiplier 5074, the texture data being read out by the source image controller 504. This allows the color data of the target figure to be computed.

A blend coefficient calculation circuit 5073 and a blending circuit 5072 make up a pixel data blend processing unit for expressing transparent objects. When the figure to be drawn is transparent, the following calculations are carried out on each pixel:

$$P = (* \times S) + ((1 - *) \times D) \qquad \text{(Exp. 2.1)}$$

where, P denotes drawing data, S stands for color data of the transparent object, * indicates a coefficient (blend coefficient) representing the degree of transparency of the object in question, and D is data about the figure behind the transparent object (i.e., frame buffer data in effect before the transparent object is drawn).

A fog coefficient calculation circuit 5084 and a fog color register 5071 make up a section that calculates a fog coefficient per pixel to provide the fog effect, whereby drawing data is determined.

The fog effect, a major characteristic of this invention, is a display-enhancing effect that approximates a foggy landscape as part of a meteorological phenomenon of the natural world.

This fog effect may be implemented by varying the blend coefficient with respect to the fog color depending on the z value of the target figure. That is, the farther the figures or objects are located from the foreground, the more they are fogged in. The degree of blend for such situations is given by the expression:

$$*=(end-z)/(end-start) \quad \text{(Exp. 2.2)}$$

where, "start" represents the Z value of the figure starting to be fogged in, "end" denotes the Z value of the figures that are completely fogged in, and "z" indicates the Z value of the target figure to be drawn.

$$*=e\char`\^-(density \times z) \quad \text{(Exp. 2.3)}$$

where, symbol ^ indicates a power exponent and "density" stands for a constant.

$$*=e\char`\^(density \times z)\char`\^ \quad \text{(Exp. 2.4)}$$

The value * above is substituted into the following expression:

$$P=(* \times F)+((1-*) \times S) \quad \text{(Exp. 2.5)}$$

where, P stands for drawing data, S for color data on the figure to be drawn, * for a fog color blend coefficient, and F for fog color. Expression 2.5 is used to carry out the same computations as those of Expression 2.1.

Where the blending circuit 5072 is used selectively depending on the situation, it is possible to let a blending circuit for drawing transparent objects and a blending circuit for providing the fog effect coexist in the same system.

As shown by Expressions 2.2 through 2.4, there are a plurality of algorithms to choose from for implementing the fog effect. The hardware is thus required to have arrangements for addressing these multiple algorithms.

Figure 7:
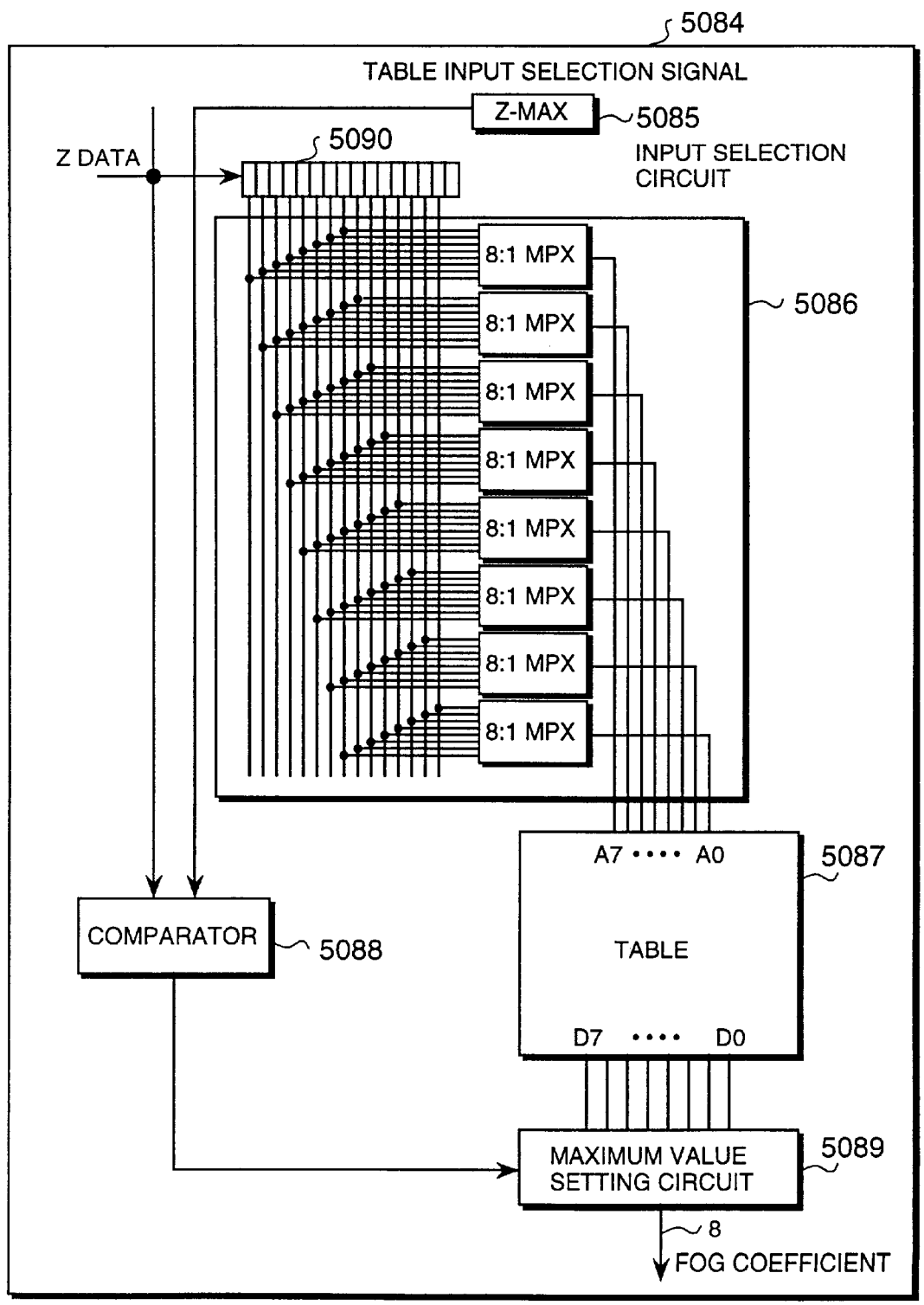
FIG. 7 is a block diagram of a fog coefficient calculation circuit.

FIG. 7 is a block diagram of a blend coefficient calculation circuit as a typical hardware structure which utilizes a table reference scheme for addressing a plurality of algorithms for calculating blend coefficients.

On receiving a Z value, the blend coefficient calculation circuit 5084 outputs a blend coefficient corresponding to that value. Where a blend ratio coefficient table in the circuit is referenced upon receipt of the Z value, the number of bits that may be input to the table may be the same as that of bits representing the Z value as long as the latter bit count is sufficiently small. As the bit count for Z values increases, the number of input bits for the table will have to be increased as well. This can result in an unacceptably large table in terms of hardware.

With this embodiment, each Z value is composed of 16 bits. If the input bit count for the table were set for 16 bits, the number of entries in the table would amount to as high as 65,536. When the appropriate scale of hardware is considered, the number of entries in the table should preferably be about 256 or less (i.e., the number of input bits is 8).

Arrangements are thus necessary to adjust the input bit count for the table. This embodiment of the invention allows the input bit count of Z values for the table to be established selectively depending on the application in use.

If the fog effect is desired within a small range of Z values, the Z value bit count may be varied from 8 to 1 in steps; if the fog effect is required in a wide range of Z values, the Z value bit count may be varied in steps from 15 to 8.

A Z-MAX register 5085 accommodates the high-order 8 bits of the Z value at which objects are completely fogged in. For example, if the fogged-in state is desired at a Z value of 65,535, a value "00000001" is set in the Z-MAX register 5085. To acquire the fogged-in state with a Z value of 131,071 requires setting a value "00000010" to the Z-MAX register 5085.

An input selection circuit 5086 comprises eight multiplexers 8:1 MPX. These multiplexers are used to let the Z value of the latch 5090 enter the table 5087, the latch content matching that of the Z-MAX register 5085. This in turn allows the table 5087 to output as a fog coefficient the data corresponding to the input value A0–A7.

If the input to the table 5087 comprises halfway Z value bits such as 12-5, any Z values which are equal to or greater than 213 will be truncated. As a result, the table 5087 will output faulty data whenever the Z value becomes equal to or greater than 213.

That problem is circumvented by this embodiment having a comparator 5088 comparing its Z value constantly with the content of the Z-MAX register 5085. Whenever the Z value turns out be greater than the value in the Z-MAX register 5085, a maximum value setting circuit 5089 sets the output of the table 5087 to a predetermined maximum value.

The scheme above makes it possible to compute fog coefficients for providing the fog effect in one cycle per pixel.

Figure 8:
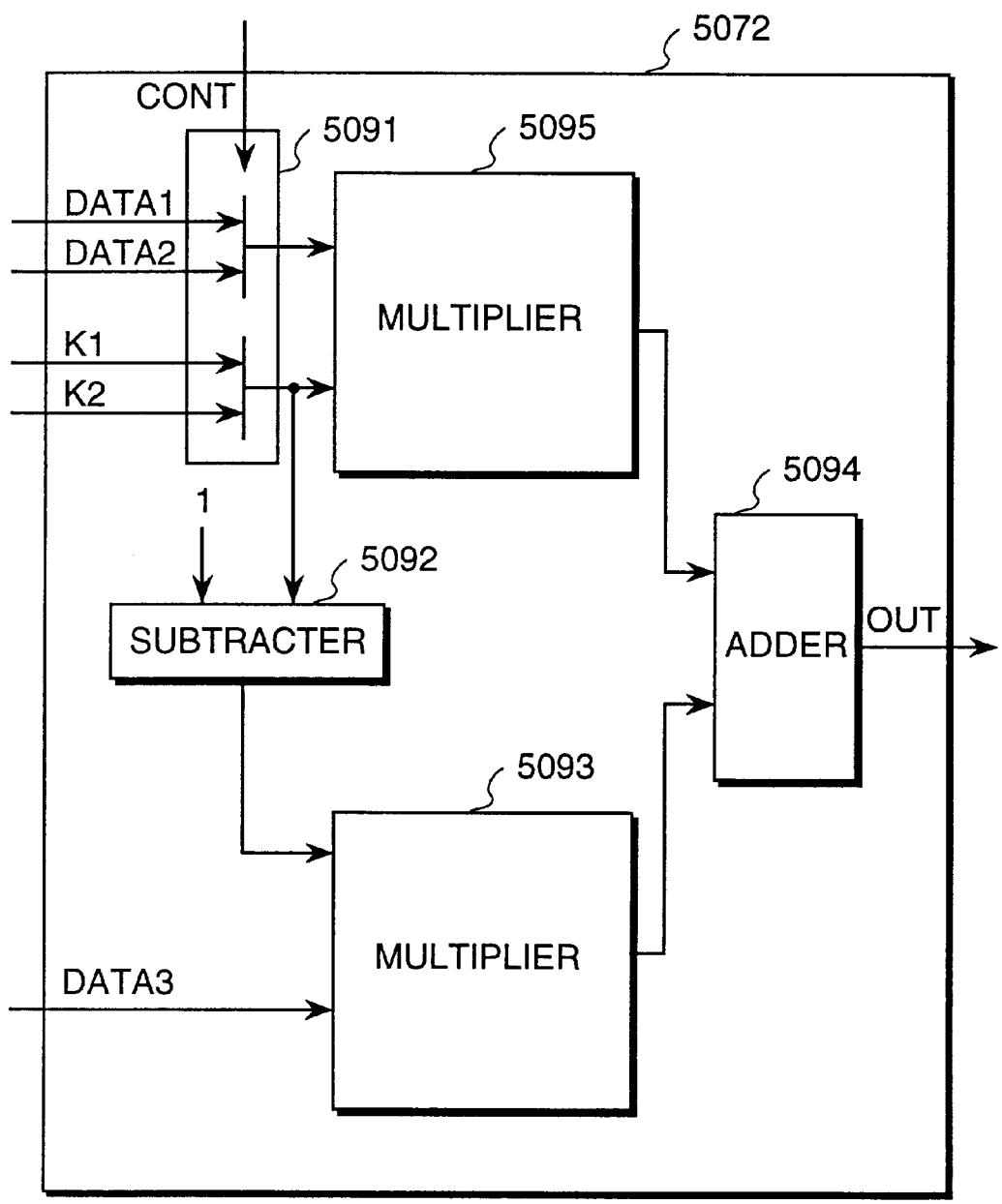
FIG. 8 is a block diagram of a blending circuit.

FIG. 8 is a block diagram of the blending circuit 5072. Executing the algorithm of Expression 2.5, the blending circuit 5072 blends color data on each pixel of the figure with data from the fog color register 5071 according to a given coefficient. It is also possible for the blending circuit 5072 to blend color data on each pixel to be drawn with color data held in the frame buffer with respect to the drawing destination of the pixel in question in accordance with Expression 2.1. This permits drawing of a transparent object.

The blending circuit 5072 in FIG. 8 includes a selector to select input data so that the blending process will serve one of two purposes: to draw transparent objects, and to provide the fog effect. In the circuit 5072, a terminal DATA1 is fed with fog color data, a terminal DATA2 is fed with read-out data from the frame buffer, a terminal DATA3 is fed with color data on the figure to be drawn, a terminal K1 is fed with a fog coefficient, and a terminal K2 is fed with a blend coefficient for a transparent object. If the blending process is desired to bring about the fog effect using the above setup, a CONT signal is set to 0 to make the selector 5091 select DATA1 and K1. To apply the blending process to the drawing of a transparent object requires setting the CONT signal to 1 to make the selector 5091 select DATA2 and K2.

Figure 9:
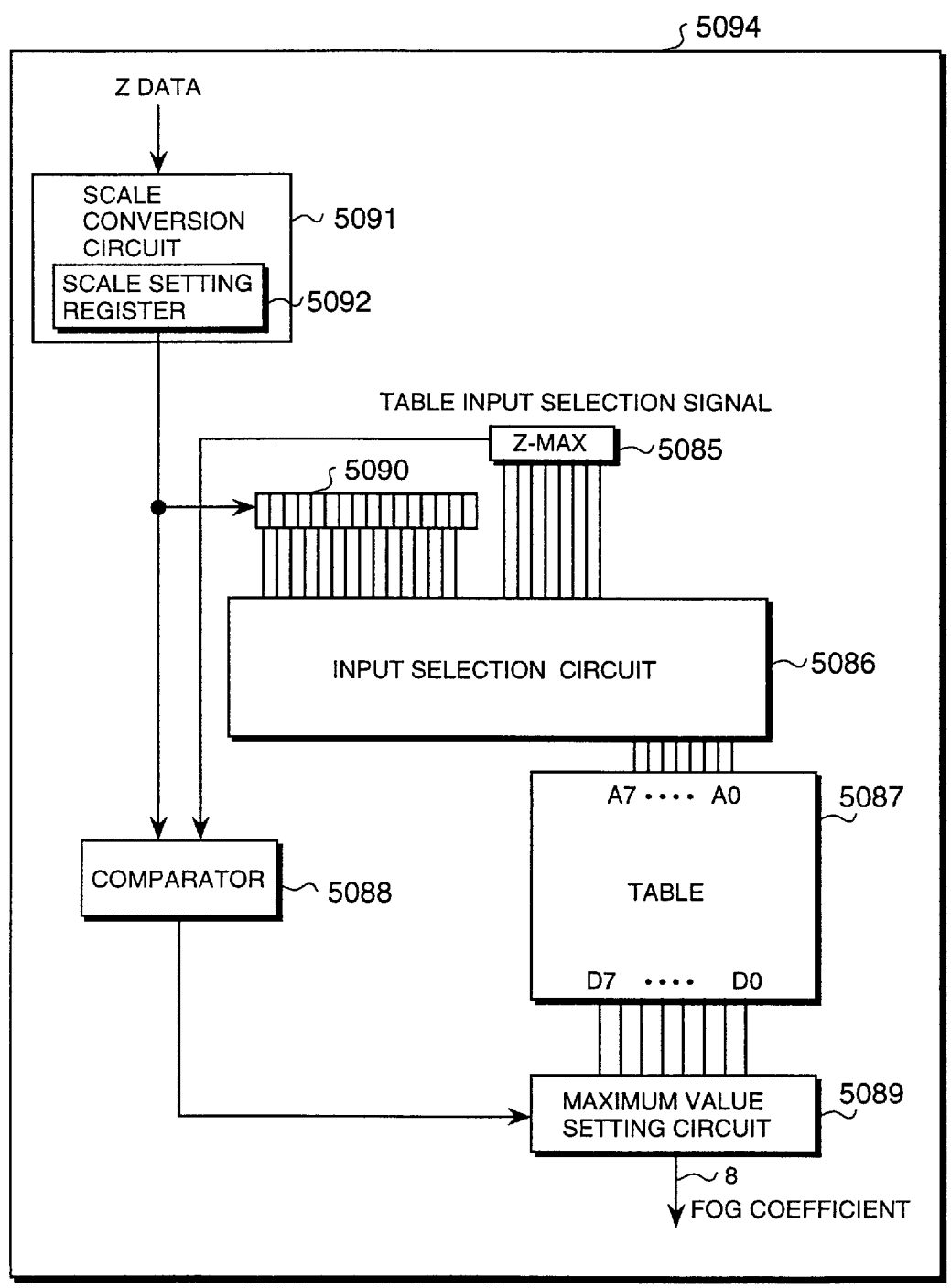
FIG. 9 is a circuit diagram of a typical scale conversion circuit.

FIG. 9 shows a blend coefficient calculation circuit in which the Z value computed by the pixel computing unit 5070 is input to the table 5087 via a scale conversion circuit 5091.

The scale conversion circuit 5091 multiplies the input Z value by the value set in a scale setting register 5092, thereby adjusting the range of Z values. For example, suppose that, when the maximum Z value of the figure to be drawn is 10,000, the table 5087 comprises coefficient data corresponding to Z values whose maximum is as small as 1,000. In such a case, the conventional solution would require completely updating the coefficients in the table. By contrast, the embodiment of the invention need only set 10 to the scale setting register 5092 in order to use the table unmodified.

In the manner described, the data in the table 5087 may be shared between applications whose Z value scales are different.

Figure 11:
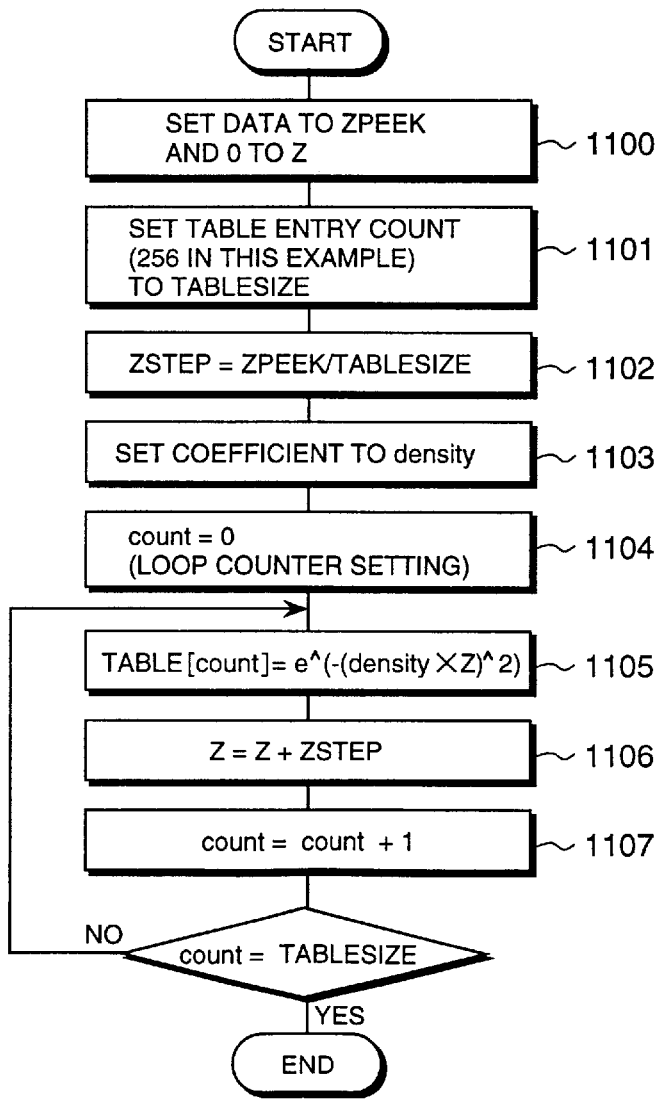
FIG. 11 is a flowchart of steps for generating table data.

How to generate data to be placed in the fog coefficient table 5087 will now be described. FIG. 11 is a flowchart of steps for generating data in the table 5087. The steps are carried out by the CPU core 10. Steps 1100 through 1104 constitute an initializing process. In this process, a maximum Z value (ZPEEK) and a step value (ZSTEP) are input. Steps 1105 through 1107 are repeated in order to set fog coefficients corresponding to Z values between 0 and 255 in the table. Usually, the table values are generated when modeling of a three-dimensional figure is carried out; these values are stored in the main memory 30 in conjunction with the figure list of FIG. 10. In some cases, the table values may be moved out to an external storage device such as a hard disk drive (not shown). Later, the data thus saved are transferred to the table 5087 in the graphics processor 50. The data transfer may take place at any time before the figure is drawn, e.g., upon system start-up, upon application program start-up, or by a user's instruction.

When a different algorithm is desired for calculating fog coefficients, the algorithm in steps 1105 in FIG. 11 is replaced by any one of the Expressions 2.2 through 2.4 shown above. With the algorithms thus switched, the CPU core 10 is restarted to carry out the steps.

As described, fog coefficient computations executed conventionally by software are carried out in one cycle per pixel by the embodiment of the invention. This amounts to a significant improvement in the speed of processing.

The table reference scheme adopted by the invention provides for a plurality of algorithms for coefficient computations. This makes it possible for the inventive system to address a wide range of applications.

What is claimed is:

1. A data processing system comprising:
   a CPU;
   a memory which stores display data; and
   a graphic processor which includes:
      a table which has stored therein blend ratio coefficients previously calculated by said CPU based on a maximum depth value and a step value, and
      a scale conversion circuit which adjusts a range of depth data,
      wherein said graphic processor calculates color data and depth data for each pixel, adjusts the depth data by use of said scale conversion circuit, reads a blend ratio coefficient corresponding to said adjusted depth data from said table, generates display data based on said blend ratio coefficient, said color data, and predetermined display color data, and stores said generated display data in said memory.

2. A data processing system according to claim 1, wherein said graphic processor comprises:
   a Z value generation device which generates said depth data on either a figure or an object, pixel by pixel, to be displayed;
   a display color data holding device which holds said display color data to be used for display;
   a blend coefficient calculation device including said table which is used to determine a blend ratio coefficient representing a color blend ratio of color data on either a figure or an object to be drawn, based on said depth data; and
   a color data blending device which generates said display color data by operating on said color data and said display data in accordance with said blend ratio coefficient.

3. A data processing system according to claim 1, wherein said graphic processor comprises:
   a Z value generation device which generates said depth data on either a figure or an object, pixel by pixel, to be displayed;
   a display color data holding device which holds said display color data to be used for display;
   a table reference device which reads depth data of a figure to be displayed and then reads from said table the blend ratio coefficient corresponding to said depth data; and
   a color data blending device which generates said display color data by operating on said color data and said display data in accordance with said blend ratio coefficient read out by said table reference device.

4. A data processing system according to claim 3, wherein, if said depth data has more bits than the number of bits that may be input to said table, said table reference device operates to select bit positions of said depth data to be input to said table.

5. A data processing system according to claim 3, wherein, if said depth data of said figure is outside the range of storage of said table, said table reference device sets a blend ratio coefficient output by said table to a predetermined value.

6. A data processing system according to claim 1, further comprising:
   a display processor which outputs said display data generated by said graphic processor and stored in said memory;
   a memory controller which controls data transfer among said CPU, said graphic processor, said display processor and an external device; and
   a display device which displays said display data generated by said graphic processor and read by said display processor from said memory.

7. A data processing system according to claim 6, wherein, if said depth data has more bits than the number of bits that may be input to said table, selected bit positions of said depth data are input to said table.

8. A data processor according to claim 6, wherein, if said depth data of said figure is outside the range of storage of said table, a blend ratio coefficient output by said table is set to a predetermined value.

9. A data processing system according to claim 6, wherein an interface is provided for performing input and output of data with other external devices.

* * * * *